(12) United States Patent
Portenier

(10) Patent No.: US 9,272,740 B1
(45) Date of Patent: Mar. 1, 2016

(54) MODULAR UTILITY TRUCK BED

(71) Applicant: Bradford Built, Inc., Washington, KS (US)

(72) Inventor: Bradly D. Portenier, Linn, KS (US)

(73) Assignee: Bradford Built, Inc., Washington, KS (US)

( * ) Notice: Subject to any disclaimer, the term of this patent is extended or adjusted under 35 U.S.C. 154(b) by 40 days.

(21) Appl. No.: 14/218,664

(22) Filed: Mar. 18, 2014

Related U.S. Application Data

(60) Provisional application No. 61/789,812, filed on Mar. 15, 2013.

(51) Int. Cl.
*B62D 25/20* (2006.01)
*B62D 33/02* (2006.01)

(52) U.S. Cl.
CPC ..................................... *B62D 33/02* (2013.01)

(58) Field of Classification Search
CPC .................................................. B62D 25/2054
USPC ................................... 296/183.1, 184.1, 39.1
See application file for complete search history.

(56) References Cited

U.S. PATENT DOCUMENTS

| | | | |
|---|---|---|---|
| 2,616,754 A | 11/1952 | Stahl | |
| 2,639,187 A * | 5/1953 | Grumbache | 296/37.6 |
| 4,126,349 A | 11/1978 | Nelson et al. | |
| 5,511,848 A | 4/1996 | Mobley | |
| 5,819,390 A | 10/1998 | Clare | |
| 6,120,078 A * | 9/2000 | Smyl | 296/39.1 |
| 6,128,815 A * | 10/2000 | Jurica et al. | 29/417 |
| 6,142,549 A | 11/2000 | Clare et al. | |
| 6,758,514 B1 * | 7/2004 | Walkden | 296/183.1 |
| 6,814,397 B2 * | 11/2004 | Henderson et al. | 296/184.1 |
| 6,893,076 B1 | 5/2005 | Lewis | |
| 7,416,236 B2 * | 8/2008 | Boddie et al. | 296/39.2 |
| 7,575,264 B1 * | 8/2009 | Solomon | 296/26.02 |
| 8,172,309 B1 * | 5/2012 | Weir | 296/183.1 |
| 2002/0117873 A1 * | 8/2002 | Lorenzo et al. | 296/39.2 |
| 2002/0149223 A1 * | 10/2002 | Saucier et al. | 296/39.2 |
| 2005/0093320 A1 | 5/2005 | Brauer et al. | |
| 2007/0222247 A1 * | 9/2007 | Jaeck | 296/26.02 |

* cited by examiner

*Primary Examiner* — H Gutman
(74) *Attorney, Agent, or Firm* — Jeffrey L. Thompson; Thompson & Thompson, P.A.

(57) ABSTRACT

A modular utility truck bed has a deck assembly comprising a center section, a right side section, and a left side section. The right and left side sections are bolted to the sides of the center section to form a substantially planar deck. A tail piece extends across a rear end of the deck assembly. The tail piece is bolted to rear ends of each of the center and side sections of the deck assembly. A front rack extends across a front end of the deck assembly. The front rack is bolted to front ends of each of the center and side sections of the deck assembly. The deck assembly, tail piece and front rack are modular components that can be shipped disassembled in a compact configuration and bolted together by the end user.

19 Claims, 5 Drawing Sheets

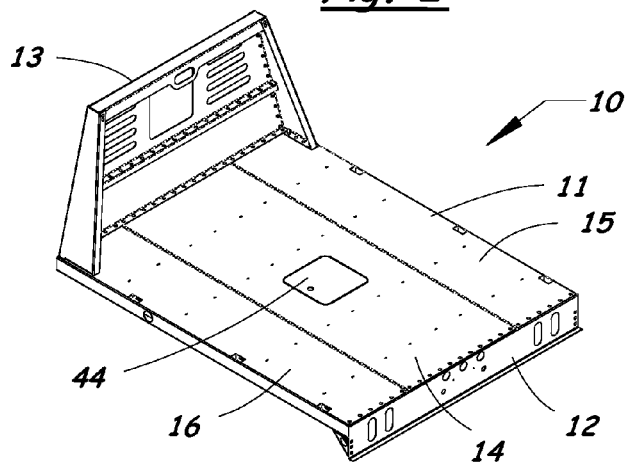
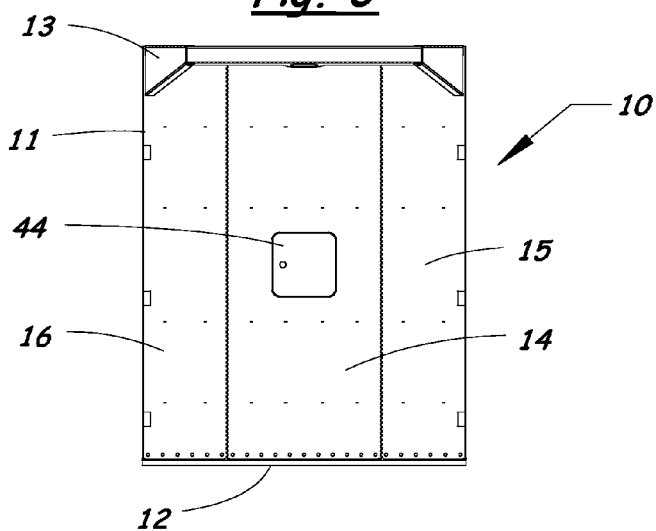
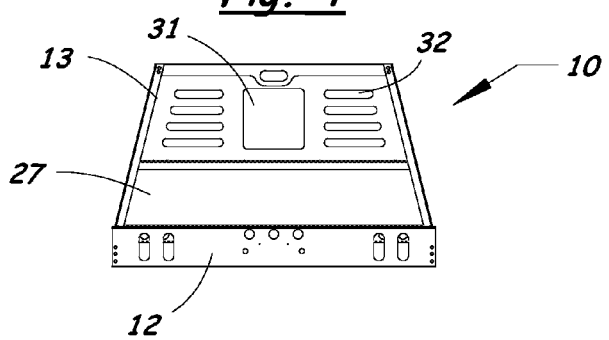

MODULAR UTILITY TRUCK BED

RELATED APPLICATIONS

This application claims the benefit of U.S. Provisional Patent Application No. 61/789,812 filed on Mar. 15, 2013. The entire content of this provisional application is incorporated herein by reference.

BACKGROUND OF THE INVENTION

1. Field of the Invention

The present invention relates generally to utility truck beds, and in particular to a utility truck bed made of modular components that can be shipped in a compact configuration and assembled together to form the truck bed.

2. Description of the Related Art

Pickup trucks have long been used for transporting and storing tools, materials, fuels, feeds, etc. for various trades, such as farming, ranching, plumbing, electrical, construction, repair, etc. Conventional pickup beds are often removed and replaced with utility truck beds of various types, such as the Workbed™ manufactured and sold by Bradford Built, Inc. of Washington, Kans. Utility truck beds provide a heavier duty bed than conventional pickup beds, and are generally preferred by users who want increased strength, carrying capacity, a larger platform, improved access, and a variety of other reasons.

However, conventional utility truck beds are manufactured by welding together various components into a complete, fully assembled unit. The complete unit is then painted and shipped in a permanent, fully assembled condition to the dealer or customer. The utility truck beds are typically loaded by the manufacturer onto flatbed semi trailers that haul the utility truck beds to dealers and end users. However, only a relatively small number of utility truck beds can be carried on a semi trailer due to space constraints created by the fully assembled condition of the utility truck beds.

There is a need in the industry for a utility truck bed that is manufactured in a modular configuration that allows more efficient transport and storage of the truck bed before it is installed by the end user.

SUMMARY OF THE INVENTION

An object of the present invention is to provide a utility truck bed that can be shipped and stored in a compact, unassembled condition prior to assembly and installation by an end user.

A further object of the present invention is to provide a utility truck bed having a modular bolt together design that can be assembled together easily using a set of wrenches.

A further object of the present invention is to provide a utility truck bed that can be shipped in an unassembled condition in a package having a significantly reduced area and volume, allowing it to be stacked and shipped efficiently in a van body semi trailer.

A further object of the present invention is to provide a utility truck bed having a unibody style system in which the frame part and deck part of each of the deck components are formed from a single piece of sheet metal.

Further objects of the present invention are to provide a utility truck bed that: can be shipped and stored in a relatively small shipping container, can be easily assembled and installed by an end user, can be configured to fit multiple pickup sizes, is efficient to manufacture, and is capable of a long operating life.

To accomplish these and other objects of the present invention, a modular utility truck bed is provided having a deck assembly with a center section, a right side section, and a left side section. The right and left side sections are bolted to the sides of the center section to form a substantially planar deck. A tail piece extends across a rear end of the deck assembly. The tail piece is bolted to rear ends of each of the center and side sections of the deck assembly. A front rack extends across a front end of the deck assembly. The front rack is bolted to front ends of each of the center and side sections of the deck assembly. The deck assembly, tail piece and front rack are modular components that can be shipped disassembled in a compact configuration and bolted together by the end user.

According to one aspect of the present invention, a utility truck bed is provided, comprising: a deck assembly with a center section, a right side section, and a left side section, the right and left side sections being bolted to respective right and left sides of the center section to form a substantially planar deck. A tail piece extends across a rear end of the deck assembly, the tail piece being bolted to rear ends of each of the sections of the deck assembly. A front rack extends across a front end of the deck assembly, the front rack being bolted to front ends of each of the sections of the deck assembly.

According to another aspect of the present invention, a modular utility truck bed is provided, comprising: a deck assembly having a center section, a right side section, and a left side section, the right and left side sections being bolted to respective right and left sides of the center section to form a substantially planar deck; a tail piece extending across a rear end of the deck assembly, the tail piece being bolted to rear ends of each of the sections of the deck assembly; a front rack extending across a front end of the deck assembly, the front rack being bolted to front ends of each of the sections of the deck assembly; the deck assembly, tail piece, and front rack are modular so that the bed can be shipped disassembled in a compact configuration and bolted together by the end user; each of the sections of the deck assembly comprises right and left longitudinally extending frame parts and a deck part formed from a single piece of sheet metal, the piece of sheet metal being folded into a channel shape along each of its longitudinal side edges to form the right and left center section frame parts; and a plurality of cross braces extending between the right and left frame parts of each of the sections of the deck assembly to increase the strength and rigidity thereof.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 2 is another perspective view of the modular utility truck bed.

FIG. 3 is a top plan view of the modular utility truck bed.

FIG. 4 is a rear view of the modular utility truck bed.

DETAILED DESCRIPTION OF THE INVENTION

Figure 1:
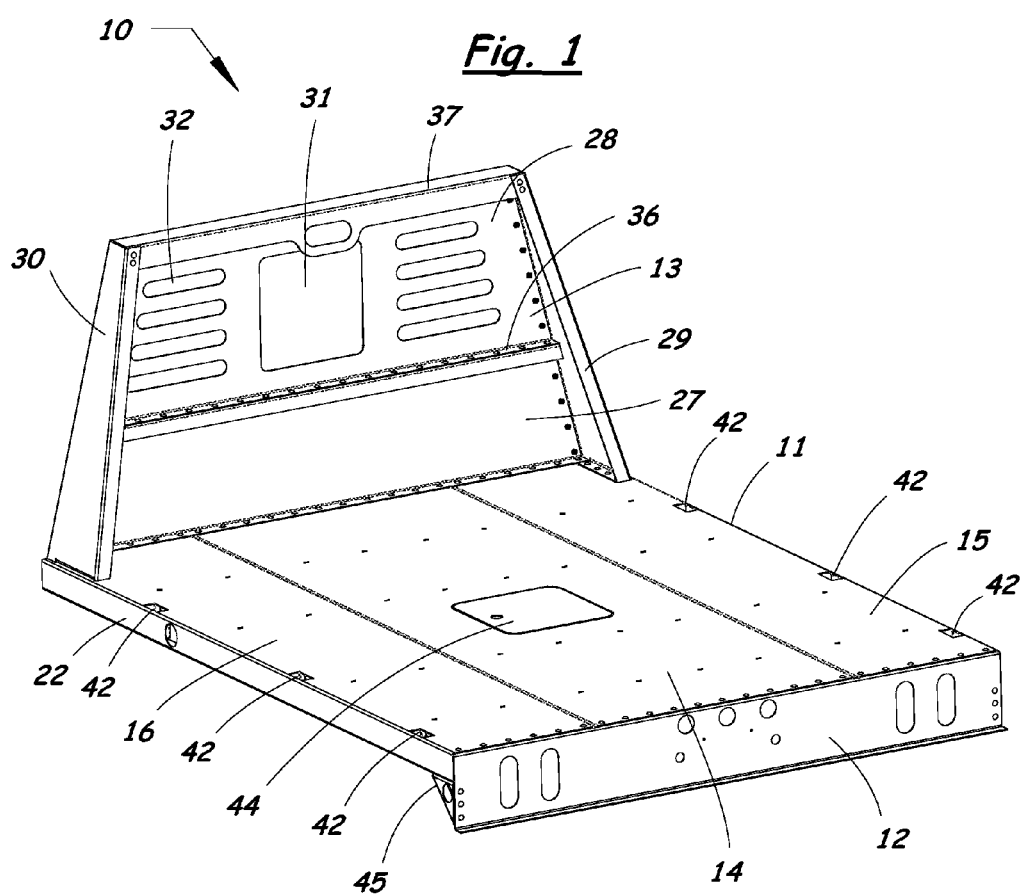
FIG. 1 is a perspective view of a modular utility truck bed according to the present invention.
Figure 5:
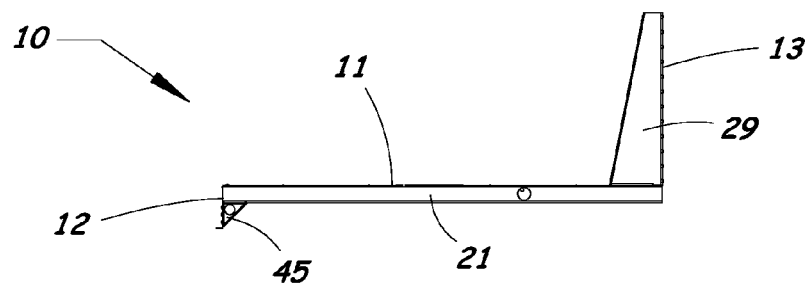
FIG. 5 is a right side view of the modular utility truck bed.
Figure 6:
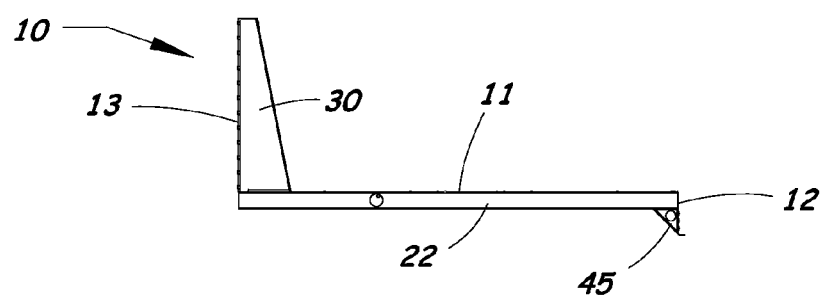
FIG. 6 is a left side view of the modular utility truck bed.
Figure 7:
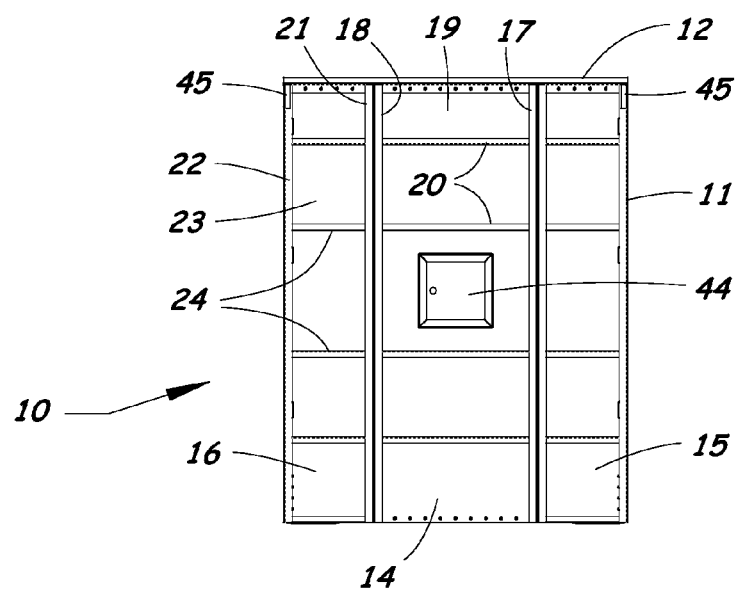
FIG. 7 is a bottom view of the modular utility truck bed.
Figure 8:
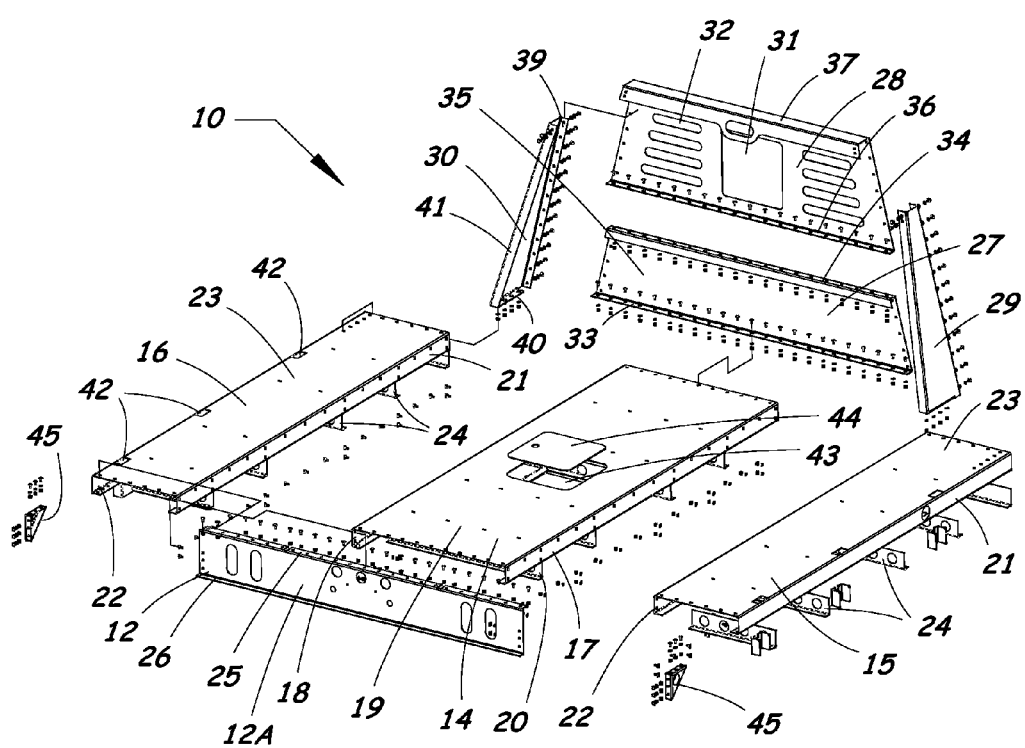
FIG. 8 is an exploded perspective view of the modular utility truck bed.
Figure 9:
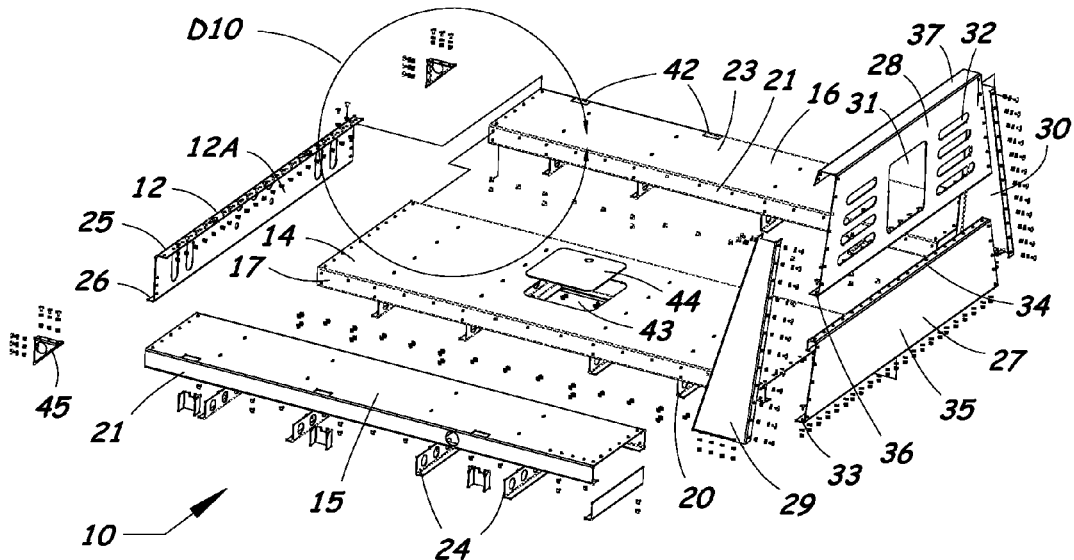
FIG. 9 is another exploded perspective view of the modular utility truck bed.
Figure 10:
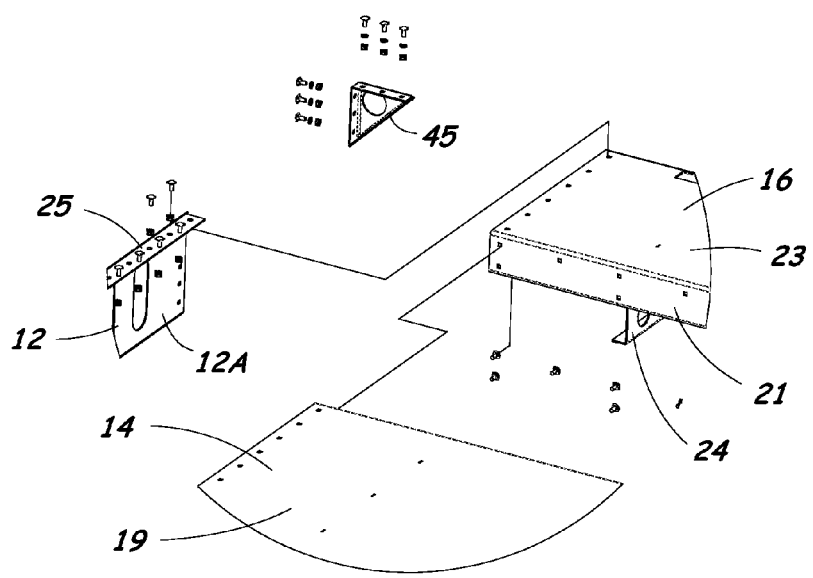
FIG. 10 is a detail view of the area labeled D10 in FIG. 9.

A modular utility truck bed 10 according to the present invention will now be described in detail with reference to FIGS. 1 to 10 of the accompanying drawings.

The utility truck bed 10 includes a deck assembly 11, a tail piece 12, and a front rack 13. The deck assembly 11, tail piece 12, and front rack 13 are modular so that the entire truck bed 10 can be shipped disassembled in a compact configuration and bolted together by the end user. All that is necessary for assembly is a set of wrenches. The reduced shipping size will allow several of the truck beds to be shipped in a van body semi trailer.

The deck assembly 11 is made up of a center section 14, a right side section 15, and a left side section 16. The right and left side sections 15, 16 are bolted to respective right and left sides of the center section 14 to form a substantially planar deck for the truck bed 10.

The center section 14 of the deck assembly 11 is formed from a single piece of sheet metal which is folded into a channel shape along each of its longitudinal side edges. The channel-shaped portions of the sheet metal provide right and left longitudinally extending frame parts 17, 18 along each longitudinal side of the center section 14. A planar deck part 19 is integral with and extends in a horizontal plane between the frame parts 17, 18. A plurality of cross braces 20 extend between the frame parts 17, 18 under the deck part 19 of the center section 14 to increase the strength and rigidity of the center section 14. The cross braces 20 can be secured to the underside of the planar deck part 19 and the facing sides of the frame parts 17, 18 by welding.

The left and right side sections 15, 16 of the deck assembly 11 are each formed from a single piece of sheet metal which is folded into a channel shape along each of its longitudinal side edges. The channel-shaped portions of the sheet metal provide right and left longitudinally extending frame parts 21, 22 along each longitudinal side of the side sections 15, 16. A planar deck part 23 is integral with and extends in a horizontal plane between the frame parts 21, 22. A plurality of cross braces 24 extend between the frame parts 21, 22 under the deck part 23 of the right and left side sections 15, 16 to increase the strength and rigidity of the side sections 15, 16. The cross braces 24 can be secured to the underside of the planar deck part 23 and the facing sides of the frame parts 21, 22 by welding.

The tail piece 12 extends across a rear end of the deck assembly 11. The tail piece 12 is bolted to rear ends of each of the center section 14 and side sections 15, 16 of the deck assembly 11. The tail piece 12 is formed from a piece of sheet metal which has an upper mounting flange 25 extending forwardly along its top edge and a lower flange 26 extending rearwardly along its bottom edge. A planar part 12A is integral with and extends in a vertical plane between the upper and lower flanges 25, 26. Gusset pieces 45 can be bolted between the side sections 15, 16 and the tail piece to stiffen and strengthen the assembly.

The front rack 13 extends across a front end of the deck assembly 11. The front rack 13 is bolted to front ends of each of the center section 14 and the side sections 15, 16 of the deck assembly 11. The front rack 13 includes a base section 27 bolted to the deck assembly 11, an upper section 28 bolted to the base section 27, and right and left side braces 29, 30 bolted to respective ends of the base section 27 and the upper section 28. The side braces 29, 30 have lower ends bolted to the right and left side sections 15, 16 of the deck assembly 11, respectively.

The upper section 28 of the front rack 13 has a large center opening 31 to accommodate a sliding rear window of a truck cab. The upper section 28 also has a plurality of small openings 32 to allow visibility through a rear window of the truck cab.

The base section 27 is formed from a piece of sheet metal which has a lower mounting flange 33 extending rearwardly along its bottom edge for bolting to the deck assembly 11, an upper channel shaped part 34 folded into its top edge, and a planar vertical portion 35 extending in a vertical plane between the bottom and top edges 33, 34.

The upper section 28 is formed from a piece of sheet metal which has a lower mounting flange 36 extending rearwardly along its bottom edge for bolting to the upper channel shaped part 34 of the base section 27, an upper channel shaped part 37 folded into its top edge, and a vertical portion 38 extending in a vertical plane between the bottom and top edges 36, 37. The openings 31, 32 are formed in the vertical portion 38.

The side braces 29, 30 are each formed from a piece of sheet metal with a front mounting flange 39 extending along its front edge for bolting to the base section 27 and the upper section 28 of the front rack 13, a lower mounting flange 40 extending along its lower edge for bolting to the side sections 15, 16 of the deck assembly 11, and a rear flange 41 extending along its rear edge for increased strength.

The right and left side sections 15, 16 of the deck assembly 11 have a plurality of receiver openings 42 for receiving detachable side rails or other truck bed accessories (not shown).

An opening 43 is provided in the middle of the deck part 19 of the center section 14 for accommodating a fifth wheel trailer hitch. A removable cover 44 is provided for covering the opening 43 when the hitch is not being used.

To accommodate a truck having dual rear wheels, the modular utility truck bed 10 of the present invention can be widened by simply using wider right and left side sections 15, 16 for the deck assembly 11. The center section 14 can remain the same for both single tire and dual tire truck sizes, thereby reducing the number of different parts necessary to accommodate both truck sizes.

While the invention has been specifically described in connection with specific embodiments thereof, it is to be understood that this is by way of illustration and not of limitation, and the scope of the appended claims should be construed as broadly as the prior art will permit.

What is claimed is:

1. A utility truck bed, comprising:
    a deck assembly comprising a center section, a right side section, and a left side section, said right and left side sections being bolted to respective right and left sides of said center section to form a substantially planar deck;
    a tail piece extending across a rear end of said deck assembly, said tail piece being bolted to rear ends of each of said sections of said deck assembly; and
    a front rack extending across a front end of said deck assembly, said front rack being bolted to front ends of each of said sections of said deck assembly;

wherein each of the sections of the deck assembly comprises right and left longitudinally extending frame parts and a deck part formed from a single piece of sheet metal.

2. The utility truck bed according to claim 1, wherein said deck assembly, tail piece, and front rack are modular so that the bed can be shipped disassembled in a compact configuration and bolted together by the end user.

3. The utility truck bed according to claim 1, wherein said center section is formed from a piece of sheet metal comprising a planar center deck part with right and left longitudinal side edges, and said piece of sheet metal is folded into a channel shape along each of said longitudinal side edges to form respective right and left center section frame parts that extend a length of said center section.

4. The utility truck bed according to claim 3, further comprising a plurality of cross braces extending under the planar center deck part between the frame parts of the center section to increase the strength and rigidity of the center section.

5. The utility truck bed according to claim 1, wherein said right side section is formed from a piece of sheet metal comprising a planar right side deck part with right and left longitudinal edges, and said piece of sheet metal is folded into a channel shape along each of its longitudinal side edges to form respective frame parts that extend a length of said right side section.

6. The utility truck bed according to claim 5, further comprising a plurality of cross braces extending under the planar right side deck part between the frame parts of the right side section to increase the strength and rigidity of the right side section.

7. The utility truck bed according to claim 1, wherein said left side section is formed from a piece of sheet metal comprising a planar left side deck part with right and left longitudinal edges, and said piece of sheet metal is folded into a channel shape along each of said longitudinal side edges to form respective frame parts that extend a length of said left side section.

8. The utility truck bed according to claim 7, further comprising a plurality of cross braces extending under the planar left side deck part between the frame parts of the left side section to increase the strength and rigidity of the left side section.

9. A utility truck bed, comprising:
a deck assembly comprising a center section, a right side section, and a left side section, said right and left side sections being bolted to respective right and left sides of said center section to form a substantially planar deck;
a tail piece extending across a rear end of said deck assembly, said tail piece being bolted to rear ends of each of said sections of said deck assembly; and
a front rack extending across a front end of said deck assembly, said front rack being bolted to front ends of each of said sections of said deck assembly;
wherein said tail piece is formed from a piece of sheet metal which has an upper mounting flange extending forwardly along its top edge, a lower flange extending rearwardly along its bottom edge, and a planar vertical portion extending between said top and bottom edges.

10. A utility truck bed, comprising:
a deck assembly comprising a center section, a right side section, and a left side section, said right and left side sections being bolted to respective right and left sides of said center section to form a substantially planar deck;
a tail piece extending across a rear end of said deck assembly, said tail piece being bolted to rear ends of each of said sections of said deck assembly; and
a front rack extending across a front end of said deck assembly, said front rack being bolted to front ends of each of said sections of said deck assembly;
wherein said front rack comprises a base section bolted to the deck assembly, an upper section bolted to said base section, and right and left side braces bolted to respective ends of said base section and said upper section, said side braces having lower ends bolted to said right and left side sections of said deck assembly, respectively.

11. The utility truck bed according to claim 10, wherein said upper section comprises a large opening to accommodate a sliding rear window of a truck cab.

12. The utility truck bed according to claim 10, wherein said upper section comprises a plurality of small openings to allow visibility through a rear window of a truck cab.

13. The utility truck bed according to claim 10, wherein said base section of said front rack is formed from a piece of sheet metal which has a lower mounting flange extending rearwardly along its bottom edge for bolting to said deck assembly, a channel shape folded into its top edge, and a planar vertical portion extending between said top and bottom edges.

14. The utility truck bed according to claim 13, wherein said upper section of said front rack is formed from a piece of sheet metal which has a lower mounting flange extending rearwardly along its bottom edge for bolting to said base section, a channel shape folded into its top edge, and a planar vertical portion extending between said bottom and top edges.

15. The utility truck bed according to claim 14, wherein said side braces of said front rack are each formed from a piece of sheet metal with a front mounting flange extending along its front edge for bolting to said base section and said upper section, a lower mounting flange extending along its lower edge for bolting to said deck assembly, and a rear flange extending along its rear edge for increased strength.

16. A utility truck bed, comprising:
a deck assembly comprising a center section, a right side section, and a left side section, said right and left side sections being bolted to respective right and left sides of said center section to form a substantially planar deck;
a tail piece extending across a rear end of said deck assembly, said tail piece being bolted to rear ends of each of said sections of said deck assembly; and
a front rack extending across a front end of said deck assembly, said front rack being bolted to front ends of each of said sections of said deck assembly;
wherein said right and left side sections of said deck assembly comprise a plurality of receiver openings for receiving detachable side rails or other truck bed accessories.

17. A utility truck bed, comprising:
a deck assembly comprising a center section, a right side section, and a left side section, said right and left side sections being bolted to respective right and left sides of said center section to form a substantially planar deck;
a tail piece extending across a rear end of said deck assembly, said tail piece being bolted to rear ends of each of said sections of said deck assembly; and
a front rack extending across a front end of said deck assembly, said front rack being bolted to front ends of each of said sections of said deck assembly;
further comprising an opening in a deck part of the center section for accommodating a fifth wheel trailer hitch, and a removable cover for covering the opening when the hitch is not being used.

18. The utility truck bed according to claim 1, wherein said right and left side sections of said deck assembly can be changed to accommodate either single tire or dual tire truck sizes without changing the center section of the deck assembly.

19. A modular utility truck bed, comprising:

a deck assembly having a center section, a right side section, and a left side section, said right and left side sections being bolted to respective right and left sides of said center section to form a substantially planar deck;

a tail piece extending across a rear end of said deck assembly, said tail piece being bolted to rear ends of each of said sections of said deck assembly;

a front rack extending across a front end of said deck assembly, said front rack being bolted to front ends of each of said sections of said deck assembly;

said deck assembly, tail piece, and front rack are modular so that the bed can be shipped disassembled in a compact configuration and bolted together by the end user;

each of the sections of the deck assembly comprises right and left longitudinally extending frame parts and a deck part formed from a single piece of sheet metal, said piece of sheet metal being folded into a channel shape along each of its longitudinal side edges to form said right and left center section frame parts on right and left sides of said deck part, respectively; and a plurality of cross braces extending under the deck part between the right and left frame parts of each of the sections of said deck assembly to increase the strength and rigidity thereof.

* * * * *